US006802132B1

(12) United States Patent
Olson

(10) Patent No.: US 6,802,132 B1
(45) Date of Patent: *Oct. 12, 2004

(54) ELECTROLYTIC TILT SENSOR AND METHOD FOR MANUFACTURING SAME

(75) Inventor: Jack R. Olson, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/671,071

(22) Filed: Sep. 25, 2003

Related U.S. Application Data

(62) Division of application No. 09/878,504, filed on Jun. 11, 2001, now Pat. No. 6,625,896.

(51) Int. Cl.$^7$ ................................................. G01C 9/06
(52) U.S. Cl. ................................. 33/366.15; 33/366.11
(58) Field of Search .......................... 33/366.15, 366.11, 33/366.18, 366.19, 366.21, 366.22, 366.25, 366.26

(56) References Cited

U.S. PATENT DOCUMENTS

| 5,852,878 | A | 12/1998 | Seipp et al. |
| 5,930,907 | A | 8/1999 | Ogawa et al. |
| 6,442,855 | B2 | 9/2002 | Takeuchi et al. |
| 6,625,896 | B1 * | 9/2003 | Olson ..................... 33/366.15 |

* cited by examiner

Primary Examiner—G. Bradley Bennett
(74) Attorney, Agent, or Firm—Allan Y. Lee; Michael A. Kagan; Peter A. Lipovsky

(57) ABSTRACT

A method for manufacturing an electrolytic tilt sensor comprises: a) forming sensing electrodes on a generally planar surface of a dielectric substrate; b) forming a reference electrode on the surface; c) mounting a housing to the substrate so that the sensing electrodes and the reference electrode are contiguous to a volume defined between the housing and the substrate; d) forming a fluid tight seal between the housing and the substrate; e) injecting an electrolytic fluid into the volume; f) sealing the electrolytic fluid in the volume; and g) forming an electrical circuit on the substrate for generating an output signal representing the angle of the dielectric substrate with respect to a gravitational field, wherein the electrical circuit includes an oscillator mounted on the surface.

9 Claims, 9 Drawing Sheets

US 6,802,132 B1

ELECTROLYTIC TILT SENSOR AND METHOD FOR MANUFACTURING SAME

CROSS-REFERENCE TO RELATED APPLICATIONS

This application is a divisional of application Ser. No. 09/878,504 filed 11 Jun. 2001, now U.S. Pat. No. 6,625,896.

BACKGROUND OF THE INVENTION

The present invention generally relates to tilt sensors, and more particularly to a an electrolytic tilt sensor that is manufactured using standard printed circuit board fabrication techniques.

Traditional tilt sensors generally use some mechanism that is influenced by the local gravitational field in order to determine the level of tilt from some horizontal reference position. One type of sensor uses a weighted, rotating pendulum that is attached to a potentiometer or variable capacitor. Accuracy of this type of sensor is limited by the design and cost of the shaft and bearing about which the pendulum swings. For many applications, a pendulum type tilt sensor is too large, heavy, and expensive. A second type of tilt sensor measures the gravitational force on a conventional or micro-machined weighted beam. Although these types of tilt sensors can be small and relatively inexpensive, the electrical output varies as the sine/cosine of the tilt angle whereupon the relation between tilt angle and electrical output varies considerably throughout the range of the sensor. A third type of tilt sensor uses variations of the traditional "bubble level." If the fluid in this type of sensor is electrically conductive, electrodes placed in contact with the fluid result in an electrical response related to the tilt angle. The changing electrical impedance between the contacts can be converted to a useable output with proper signal conditioning electronics.

Historically, most of these types of sensors have been hand assembled using precious metal electrode wires, glass housings, and lead wires that have been sealed and attached by hand.

Thus, these types of sensors require skilled labor assembly, which tends to be costly. More recently, glass housed tilt sensors have been made by machine, which lowers their fabrication costs, but are only available in limited configurations. Even with lowered manufacturing costs, tilt sensors that have glass housings are very fragile and still expensive to mount in an instrument housing. Some manufacturers sell sensors mounted in machined metal housings. However, sensors mounted in metal housings are relatively expensive, and too large for many applications.

A need therefore exists for a tilt sensor that is inexpensive to manufacture, small, and easily mounted. A further need exists for a tilt sensor that can be massed produced with very repeatable performance characteristics.

SUMMARY OF THE INVENTION

A method for manufacturing an electrolytic tilt sensor comprises: a) forming sensing electrodes on a generally planar surface of a dielectric substrate; b) forming a reference electrode on the surface; c) mounting a housing to the substrate so that the sensing electrodes and the reference electrode are contiguous to a volume defined between the housing and the substrate; d) forming a fluid tight seal between the housing and the substrate; e) injecting an electrolytic fluid into the volume; f) sealing the electrolytic fluid in the volume; and g) forming an electrical circuit on the substrate for generating an output signal representing the angle of the dielectric substrate with respect to a gravitational field, wherein the electrical circuit includes an oscillator mounted on the surface.

In another aspect of the invention, an electrolytic tilt sensor, comprises: a) a dielectric substrate having a first planar surface; b) a first sensing electrode affixed to the dielectric substrate and having a second planar surface entirely in contact with the first planar surface; c) a second sensing electrode affixed to the dielectric substrate and having a third planar surface entirely in contact with the first planar surface; d) a reference electrode affixed to the dielectric substrate and having a fourth planar surface entirely in contact with the first planar surface; e) a housing mounted to the dielectric substrate so that the first and second sensing electrodes and the reference electrode are contiguous to a volume defined between the housing and the dielectric substrate; f) a fluid tight seal formed between the housing and the dielectric substrate; g) an electrolytic fluid contained within the volume; and h) electrical circuitry mounted on the dielectric substrate and electrically coupled to the first and second sensing electrodes, and to the reference electrode for generating an electrical signal representing an angular displacement of the electrolytic fluid with respect to the dielectric substrate, wherein the electrical circuitry includes an oscillator mounted on the first planar surface.

BRIEF DESCRIPTION OF THE DRAWINGS

Throughout the several view, like elements are referenced using like references.

DESCRIPTION OF THE PREFERRED EMBODIMENTS

Figure 1:
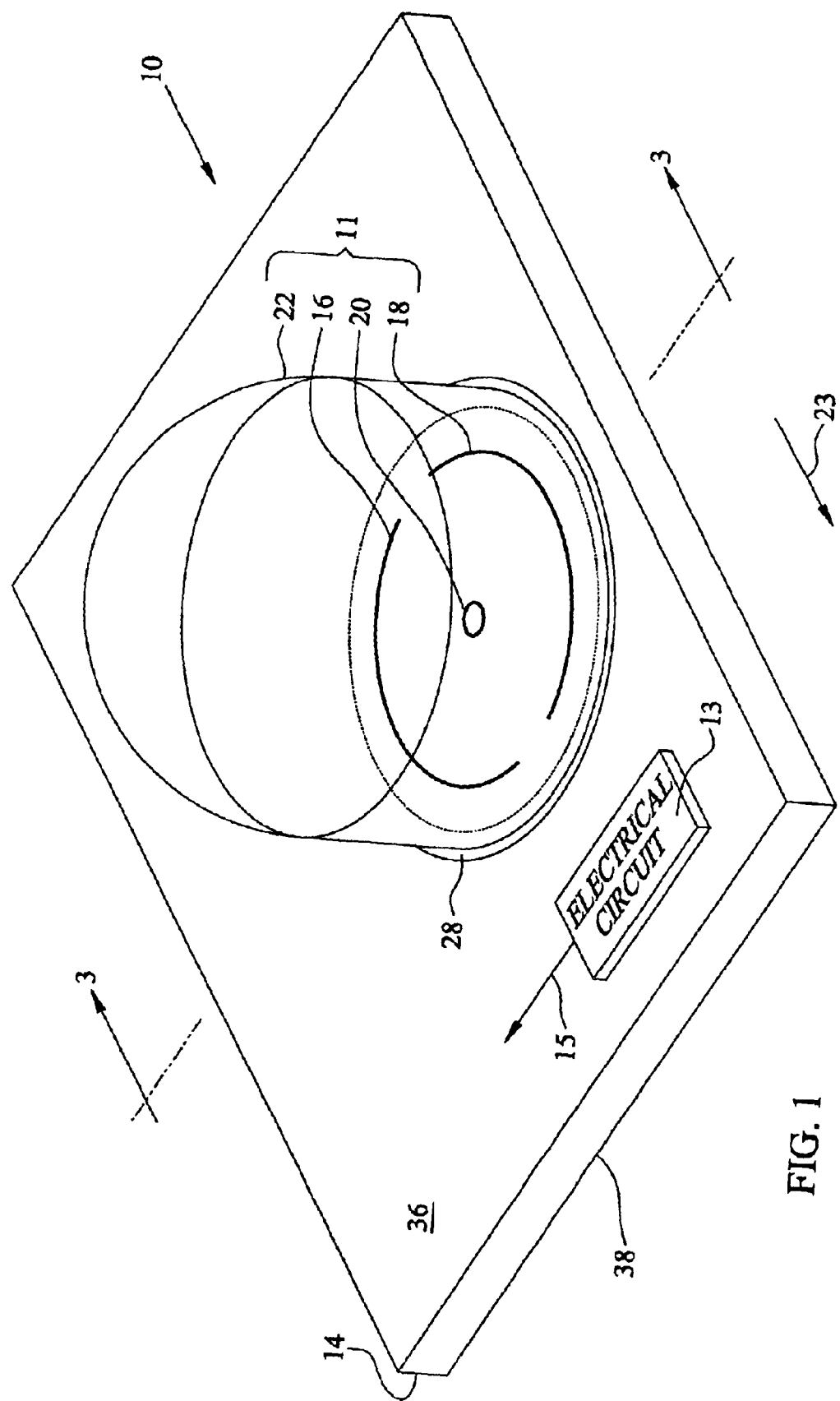
FIG. 1 illustrates an electrolytic tilt sensor that is manufactured in accordance with methods embodying various features of the present invention.
Figure 2:
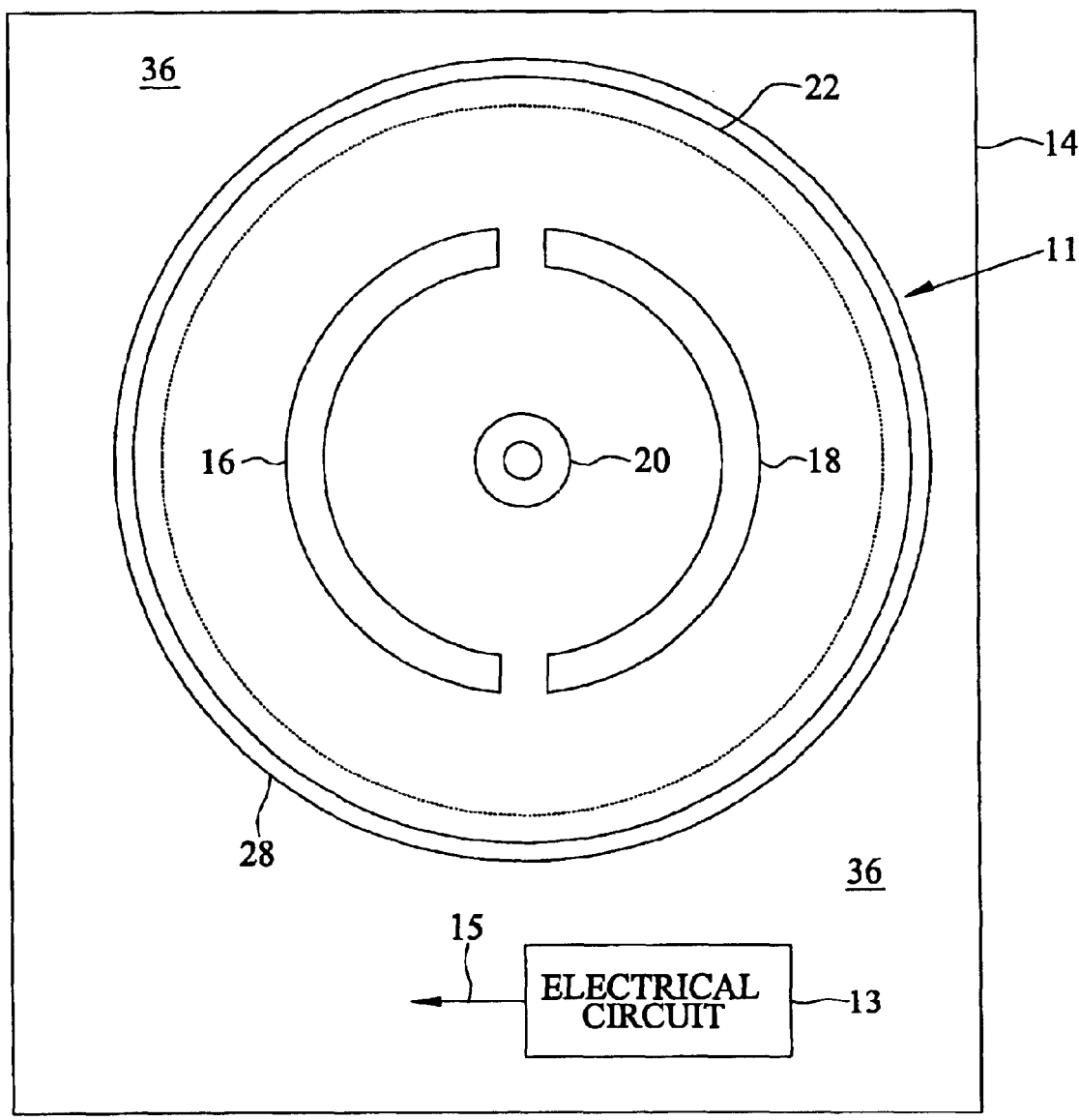
FIG. 2 illustrates a view showing one side of the printed circuit board of the electrolytic tilt sensor of FIG. 1.
Figure 3:
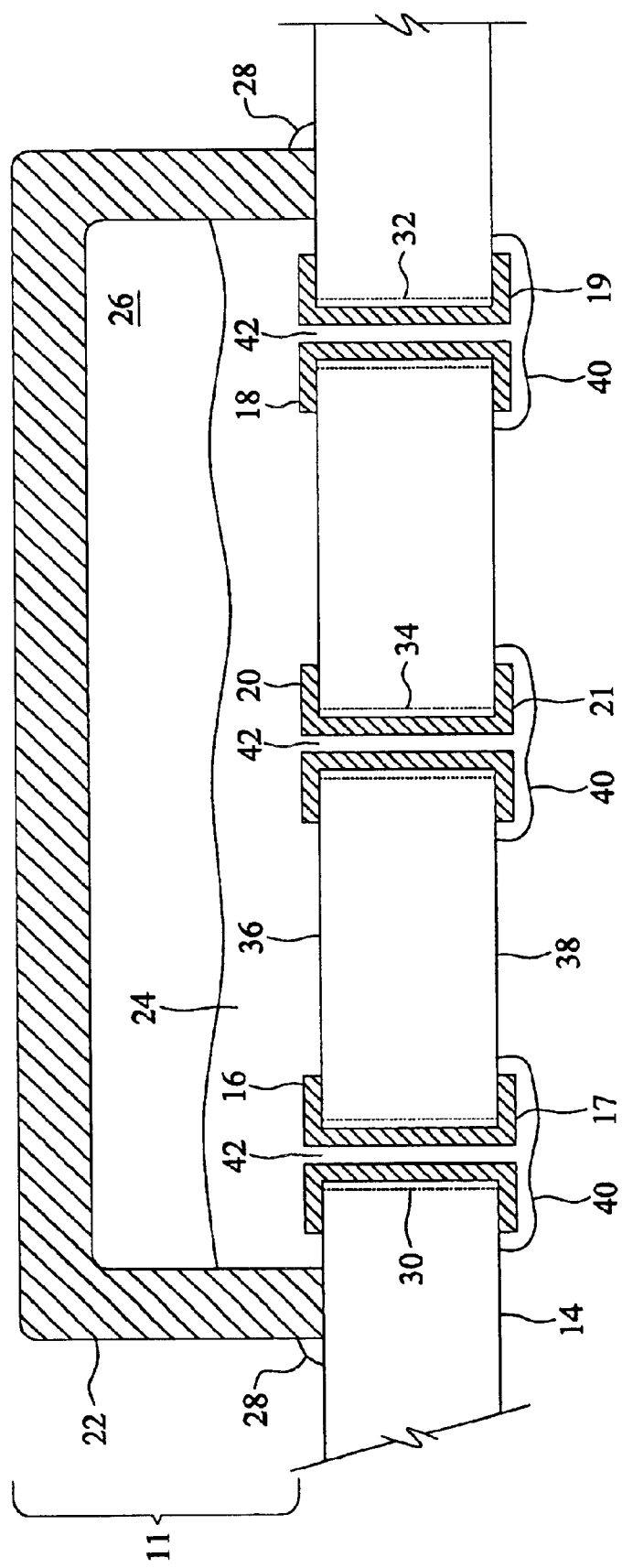
FIG. 3 is a cross-sectional view of the electrolytic tilt sensor of FIG. 1 taken along reference line 3—3.

Referring now to FIGS. 1, 2, and 3, collectively, there is shown an electrolytic tilt sensor 10 that includes an electrically insulating substrate 14, such as a printed circuit board, an electrolytic sensing element 11 fabricated on the substrate 14, and an electrical circuit 13 that is also fabricated on the substrate and electrically interconnected to the electrolytic sensing element 11. The electrical circuit 13 of sensor 10 generates an output signal 15 that is functionally related to the angular displacement of the sensing element 11, and hence, the substrate 14, with respect to a local gravitational field 23. In general, gravitational field 23 is oriented in a plane parallel to the surface of substrate 14 on which the electrolytic sensing element 11 is mounted.

The sensing element 11 includes a first sensing electrode 16, a second sensing electrode 18, a reference electrode 20, and a housing 22. The electrodes 16, 18, and 20 are formed on the substrate 14 using standard printed circuit fabrication techniques, and are enclosed within housing 22 which is mounted to substrate 14. An electrolytic liquid 24 partially fills the volume 26 defined between the substrate 14 and interior of the housing 22, whereupon liquid 24 provides a varying degree of electrical continuity between the electrodes 16, 18, 20, depending on the tilt angle of sensor 10, including the substrate 14 and sensing electrodes 16 and 18, and reference electrode 18, with respect to a gravitational field 23. A bead of sealant 28, such as epoxy, is formed adjacent to the housing 22 and substrate 14 to provide a fluid tight seal so that the electrolytic fluid 24 is retained, or secured within volume 26. The housing 22 may be shaped such as a cup, hemisphere, or any other shape for defining a volume between the housing 22 and the substrate 14. By way of example, housing 22 may be made of glass, metal, plastic, nylon, quartz, or any other non-conductive material that provides a relatively rigid, fluid tight structure that may be mounted to and sealed with respect to substrate 14 so as to define a volume 26 for retaining electrolytic fluid 24 within the volume.

As shown in FIG. 2, first sensing electrodes 16 and 18 may be semicircular in shape and concentrically opposed about reference electrode 20. However, it is to be understood that electrodes 16 and 18 may have other shapes, as for example, where a particular function of voltage or impedance versus tilt angle is required to suit the needs of a specific application. Such function may be linear, non-linear, asymptotic, or some combination of any or more functional relations.

Figure 4:
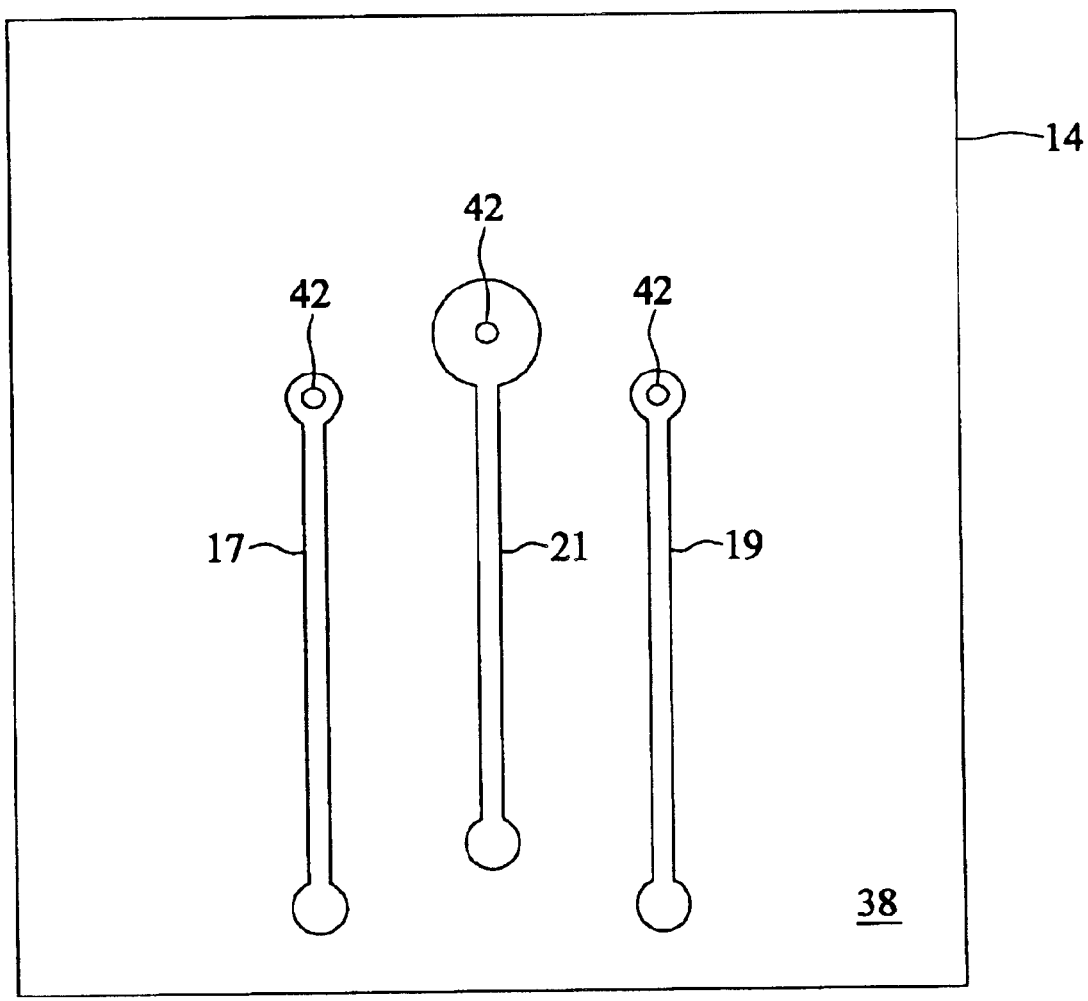
FIG. 4 illustrates a view showing a second side of the printed circuit board of the electrolytic tilt sensor of FIG. 1.

Referring to FIG. 3, apertures 30, 32, and 34 may be formed in substrate 14 to facilitate electrical continuity between the generally parallel and opposed surfaces of 36 and 38 of insulating substrate 14. Reference electrodes 16 and 18 extend from side 36 of substrate 14 through side 38 of substrate 14, where sides 34 and 36 are generally parallel and opposite each other. Sensing electrodes 16 and 18, and reference electrode 20 extend through apertures 30, 32, and 34, respectively. Also referring to FIG. 4, sensing electrode 16 is electrically connected to first electrically conductive sensing trace 17 formed on surface 38 of insulating substrate 14. Sensing electrode 18 extends through aperture 32 and is electrically connected to second electrically conductive sensing trace 19 that is formed on surface 38. Reference electrode 20 extends through aperture 34 and is electrically connected to electrically conductive reference trace 21. As a result of standard plating processes, vias 42 are typically formed in each of sensing electrodes 18 and 20, and in reference electrode 20 that extend from surface 38 to surface 36, and through traces 17, 18, and 21 that are formed on surface 38 of substrate 14 as shown in FIG. 4. Traces 17, 18, and 21 maybe formed using standard printed circuit board fabrication techniques.

Electrolytic fluid 24 is an electrically conductive fluid such as alcohol, ionized water, or other electrically conductive fluids. A predetermined volume of fluid 24 may be injected into volume 26, as for example, by use of a syringe, not shown, through one of vias 42 to partially, but not completely fill volume 26. After fluid 24 is inserted into volume 26, dollops of sealant 40, such as epoxy, may be placed over vias 42 to secure the electrolytic fluid 24 within volume 26.

Figure 5:
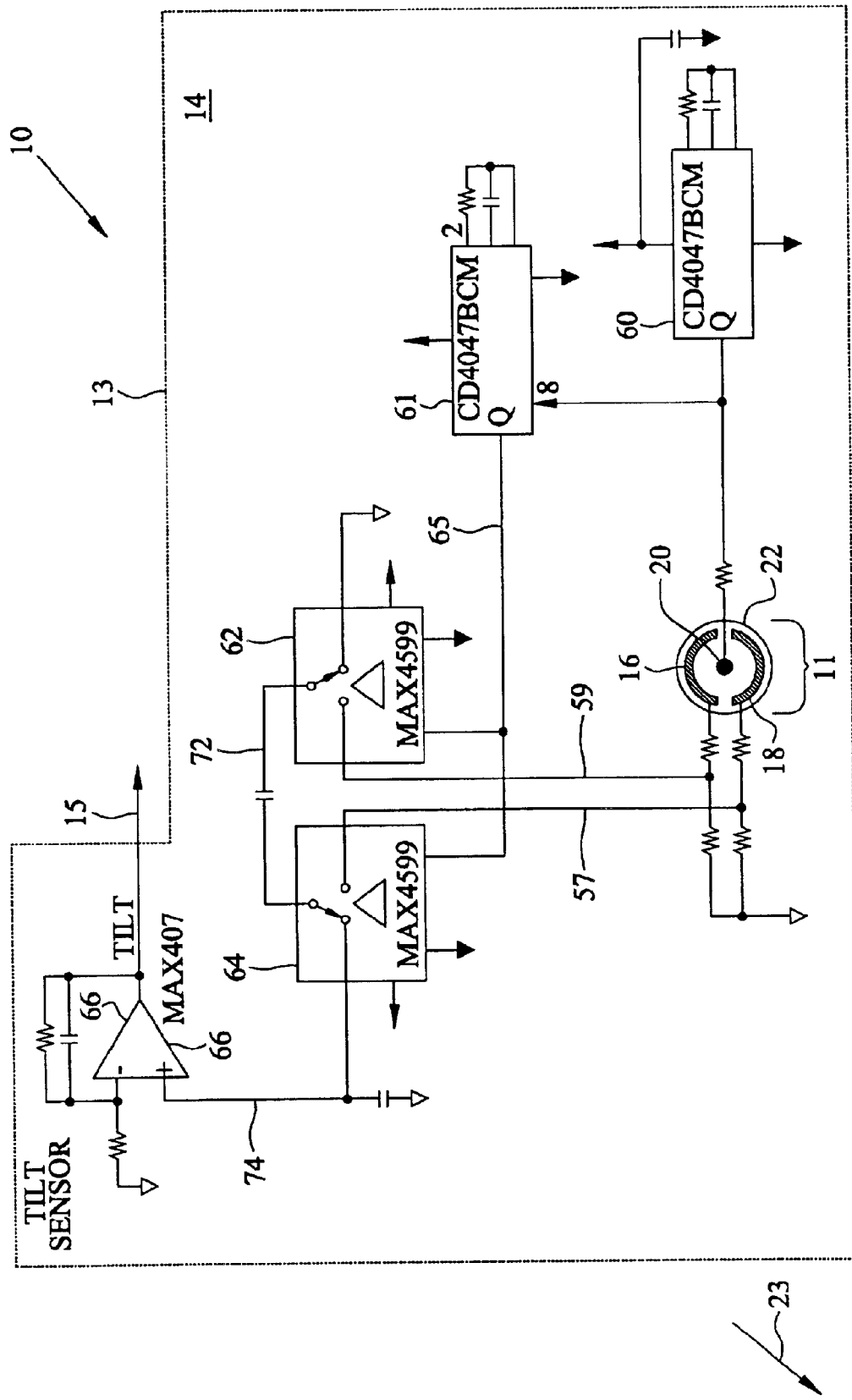
FIG. 5 is an example of electrical circuitry of the electrolytic tilt sensor shown in FIG. 1.
Figure 8:
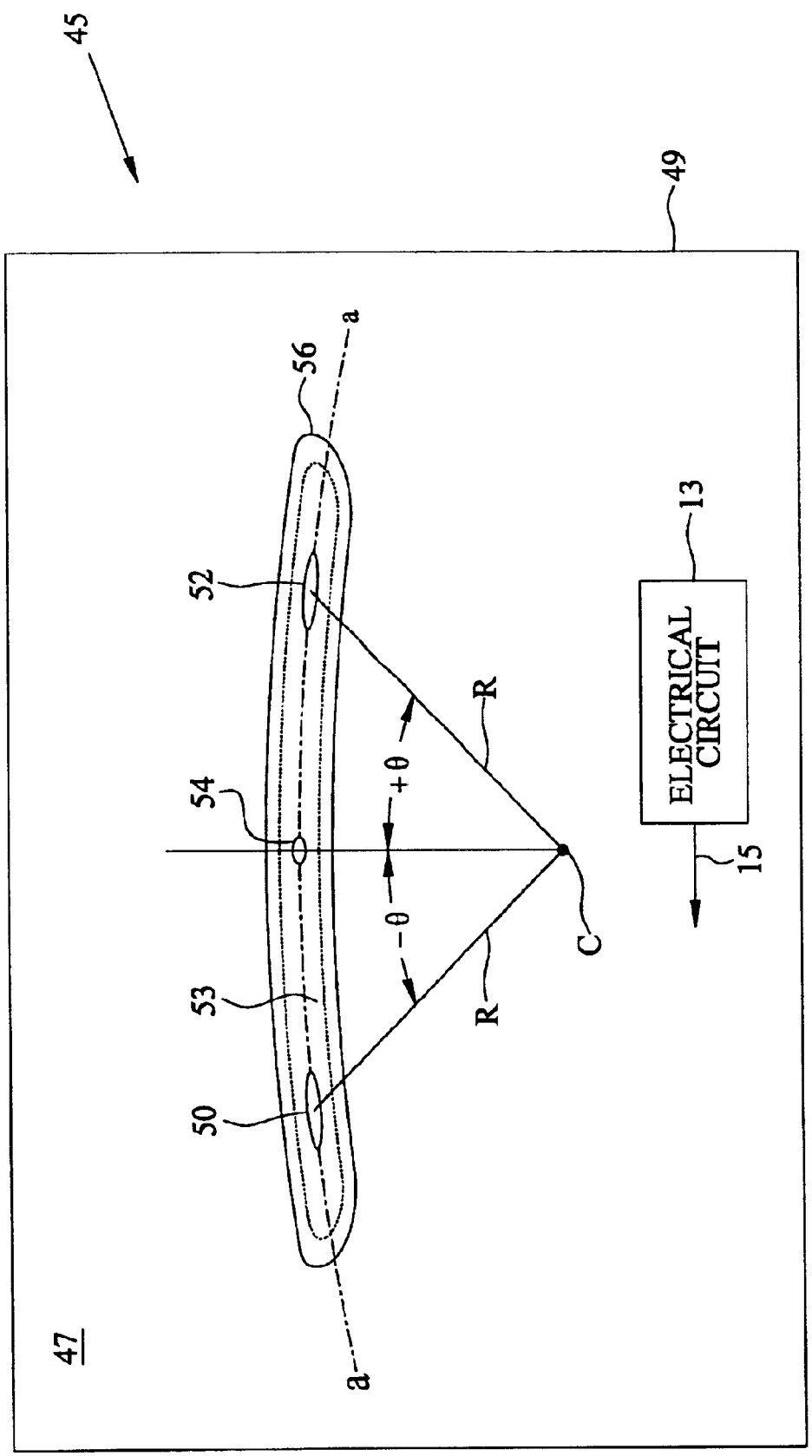
FIG. 8 is an example of another embodiment of an electrolytic tilt sensor for detecting extremes of angular displacement that embodies various features of the present invention.

Referring to FIG. 5, sensing electrodes 16 and 18 are electrically coupled to electrical circuit 13 which includes an oscillator 60 that provides AC electrical power to reference electrode 20. Electrically conductive fluid 24 (not shown in FIG. 5) provides electrical continuity between reference electrode 20 and sensing electrodes 16 and 18 to an extent determined by the angular displacement of electrolytic sensing element 11 with respect to a local gravitational field 23. Changes in angular displacement of electrolytic sensing element 11 cause the relative impedances detected by signal lines 57 and 59 to vary. Sampling pulses are provided through the Q output of circuit 61 to circuits 62 and 64 via signal line 65. Circuits 62 and 64 collectively provide a phase demodulation circuit that is connected via signal lines 72 and 74, respectively, to the positive input of operational amplifier 66. Operational amplifier 66 transforms input signals 72 and 74 into an amplified DC output signal 15 that represents the angular displacement of sensing element 11 with respect to gravitational field 23. The example of electrical circuit 13 depicted in FIG. 8 is presented by way of example only. It is to be understood that the scope of the invention includes the manufacture of an electrolytic tilt sensor having other suitable electrical circuitry formed along with electrolytic sensing element 11 on a single substrate such as substrate 14.

Figure 6:
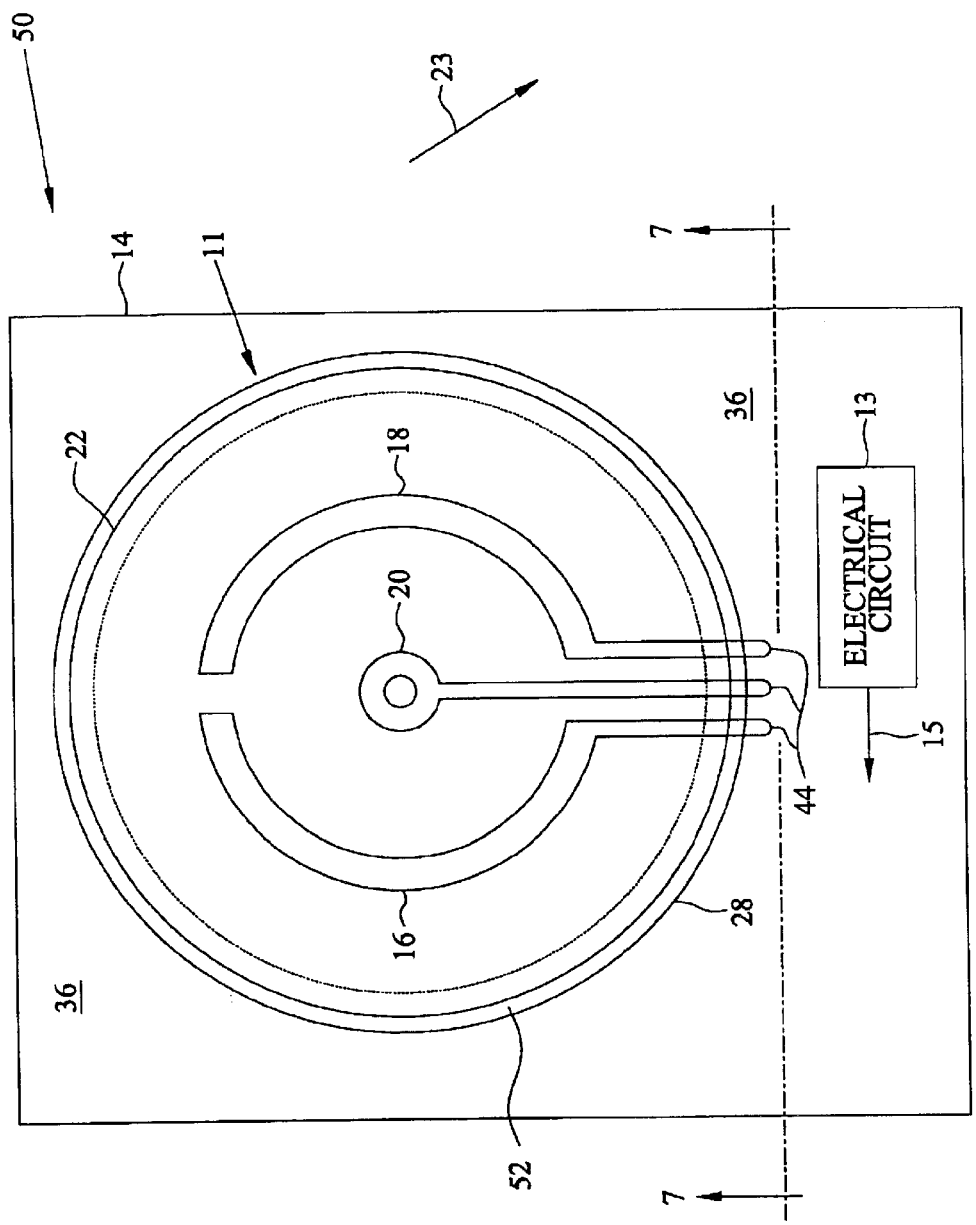
FIG. 6 is a view of another embodiment of an electrolytic tilt sensor manufactured in accordance with the methods of the present invention.
Figure 7:
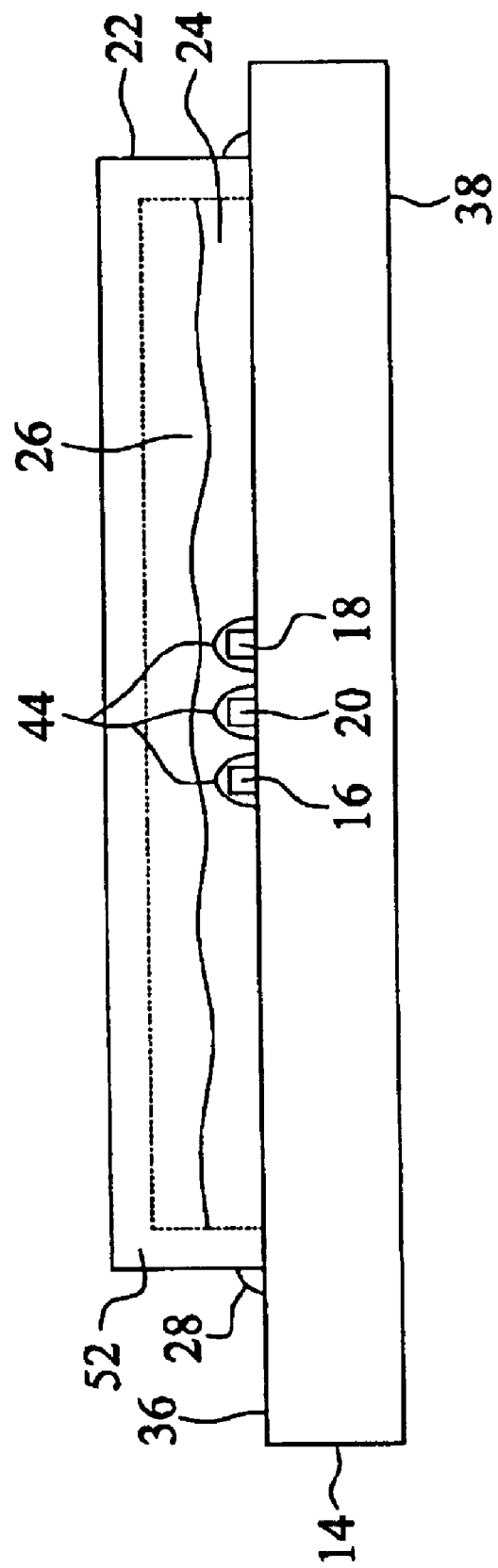
FIG. 7 is a cross-sectional view of the electrolytic tilt sensor of FIG. 6 taken along reference line 7—7.

FIGS. 6 and 7 show another example of an electrolytic tilt sensor 50. Sensor 50 includes an electrically insulating substrate 14, such as a printed circuit board, a first sensing electrode 16, a second sensing electrode 18, a reference electrode 20, and a housing 22. The electrodes 16, 18, and 20 preferably are formed onto surface 36 of substrate 14 using standard printed circuit fabrication techniques, and are partially enclosed within housing 22 which is mounted to substrate 14. An electrolytic liquid 24 partially fills the volume 26 defined between the substrate 14 and interior of the housing 22. A bead of sealant 28, such as epoxy, is formed adjacent to the housing 22 and substrate 14 to provide a fluid tight seal so that the electrolytic fluid 24 is retained within volume 26.

Still referring to FIGS. 6 and 7, first sensing electrodes 16 and 18 may be semicircular in shape and concentrically opposed about reference electrode 20. Housing 22 encloses electrodes 16, 18, and 20 except where electrodes 16, 18, and 20 extend beyond the external perimeter 52 of housing 22. It is to be noted that electrolytic fluid 24 provides electrical continuity between the surfaces of electrodes 16, 18, and 20 within volume 26. The degree of electrical continuity depends on the tilt angle of sensor 50 with respect to gravitational field 23. The regions of electrodes 16, 18, and 20 that extend beyond perimeter 52 of housing 22 maybe coated with an electrically insulating coating, or layer 44 to facilitate the routing of lead traces on substrate 14, and to reduce the number of steps required to seal the vias 42.

FIG. 8 shows an example of another embodiment of an electrolytic tilt sensor embodying various features of the invention. In FIG. 8, tilt sensor 45 is shown to include sensing electrodes 50 and 52 that are formed on surface 47 of insulating substrate 49. Sensing electrodes are located along an arcuate segment α—α and separated by angular displacement 20 with respect to a point C representing the center of arcuate segment α—α having radius R.

Reference electrode 54 is positioned on surface 47 and centered at an angle θ along arcuate segment α—α midway between sensing electrodes 50 and 52. A housing 56 is mounted to surface 47 of substrate 49 to define a volume 53 between the housing and the surface 47 over electrodes 50, 52, and 54 for holding electrolytic fluid (not shown) within the volume. A characteristic of electrolytic tilt sensor 45 is that it may be used to indicate only tilt angles of sensor 45 that attain a predetermined angle of displacement, as for example, ±θ, but no tilt angles less than /θ/.

When sensor 10 is in a neutral, or horizontal position, electrolytic fluid 24 typically covers half of the reference electrode 20 and equal lengths of the sensing electrodes 16 and 18.

As the electrolytic sensing element 11 of sensor 10 is angularly displaced, the relative degree to which fluid 24 covers sensing electrodes 16 and 18 changes. In other words, more of electrode 18 or 20 will be covered by fluid 24 than will the other sensing electrode, while fluid 24 always covers reference electrode 20. Thus, the electrical impedances between the reference electrode 20 and each of the sensing electrodes 16 and 18 changes as the angular displacement of sensing element 11 changes. Electrical circuit 13 generates an output signal 15 that is functionally related to the angular displacement of the sensor 10, i.e. a positive angular rotation or negative angular rotation with respect to the gravitational field 23.

Figure 9:
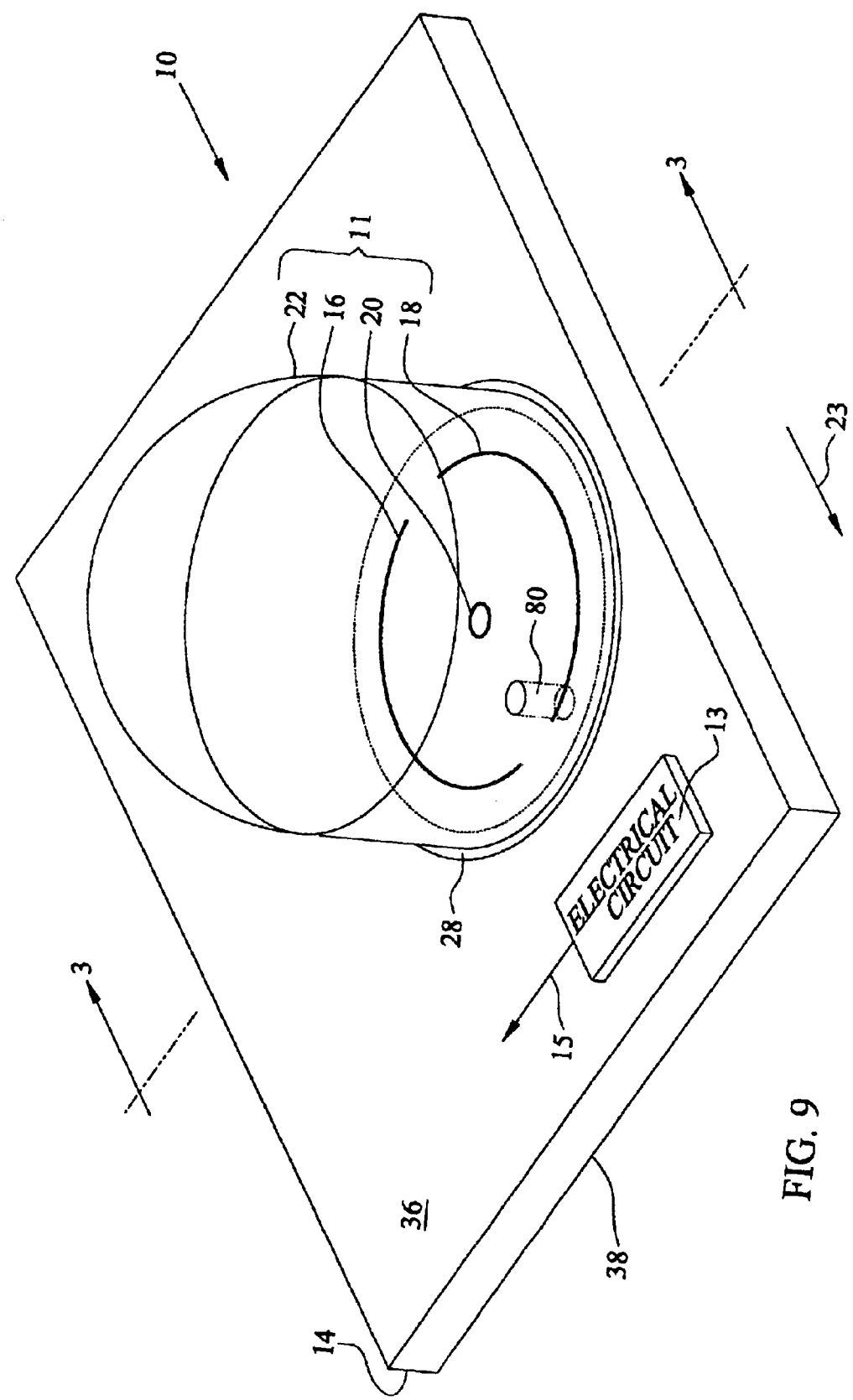
FIG. 9 shows an aperture formed in the housing of FIG. 1.

Obviously, many modifications and variations of the present invention are possible in light of the above teachings. For example, electrolytic fluid 24 may inserted through an aperture 80 formed through housing 22, as shown in FIG. 9, or some location in substrate 14 other than as described above.

Although the electrolytic tilt sensor 10 has been described as having two sensing electrodes, the scope of the invention includes the use of any number of sensing electrodes required to suit the needs of a particular application. For example, sensing electrode 10 may include only one sensing electrode if the sensor is only required to sense tilt in one direction. Three or more sensing electrodes may be used in sensor 10 for application where detection of incremental changes in tilt is desired. It is therefore to be understood that within the scope of the appended claims, the invention may be practiced otherwise than as specifically described.

I claim:

1. A method for manufacturing an electrolytic tilt sensor, comprising the steps of:

forming first and second sensing electrodes on a generally planar surface of a dielectric substrate;

forming a reference electrode on said generally planar surface;

mounting a housing to said dielectric substrate so that said first and second sensing electrodes and said reference electrode are contiguous to a volume defined between said housing and said dielectric substrate;

forming a fluid tight seal between said housing and said dielectric substrate;

injecting an electrolytic fluid into said volume;

sealing said electrolytic fluid in said volume; and forming an electrical circuit on said dielectric substrate for generating an output signal representing an angular position of said dielectric substrate with respect to a gravitational field, wherein said electrical circuit includes an oscillator mounted on said planar surface.

2. The method of claim 1 further including the step of:

forming a via through said dielectric substrate, and wherein the step of injecting includes injecting said electrolytic fluid through said via into said volume, and the step of sealing includes sealing said via.

3. The method of claim 1 wherein said dielectric substrate is a printed circuit board.

4. The method of claim 1 further including the step of forming an aperture through said housing, wherein the step of injecting includes injecting said electrolytic fluid through said aperture, and the step of sealing includes sealing said aperture to secure said electrolytic fluid in said volume.

5. An electrolytic tilt sensor, comprising:

a dielectric substrate having a first planar surface;

a first sensing electrode affixed to said dielectric substrate and having a second planar surface entirely in contact with said first planar surface;

a second sensing electrode affixed to said dielectric substrate and having a third planar surface entirely in contact with said first planar surface;

a reference electrode affixed to said dielectric substrate and having a fourth planar surface entirely in contact with said first planar surface;

a housing mounted to said dielectric substrate so that said first and second sensing electrodes and said reference electrode are contiguous to a volume defined between said housing and said dielectric substrate;

a fluid tight seal formed between said housing and said dielectric substrate;

an electrolytic fluid contained within said volume; and electrical circuitry mounted on said dielectric substrate and electrically coupled to said first and second sensing electrodes, and to said reference electrode for generating an electrical signal representing an angular displacement of said electrolytic fluid with respect to said dielectric substrate, wherein said electrical circuitry includes an oscillator mounted on said first planar surface.

6. The electrolytic tilt sensor of claim 5 wherein said reference electrode and said first and second sensing electrodes are positioned along an arcuate path, and said reference electrode is interposed between said first and second sensing electrodes.

7. A method for manufacturing an electrolytic tilt sensor, comprising the steps of:

forming first and second sensing electrodes on a printed circuit board using printed circuit board fabrication techniques;

forming a reference electrode on said printed circuit board using said printed circuit board fabrication techniques;

mounting a housing to said printed circuit board so that said first and second sensing electrodes and said reference electrode are contiguous to a volume defined between said housing and said printed circuit board;

forming a fluid tight seal between said housing and said printed circuit board;

injecting an electrolytic fluid into said volume;

sealing said electrolytic fluid in said volume; and forming an electrical circuit having an oscillator on said printed circuit board for generating an output signal representing an angular position of said printed circuit board with respect to a gravitational field.

8. The method of claim 7 further including the step of:

forming a via through said printed circuit board, wherein the step of injecting includes injecting said electrolytic fluid through said via into said volume, and the step of sealing includes sealing said via.

9. The method of claim 7 further including the step of forming an aperture through said housing, wherein the step of injecting includes injecting said electrolytic fluid through said aperture, and the step of sealing includes sealing said aperture to secure said electrolytic fluid in said volume.

* * * * *